Patented Nov. 8, 1932

1,886,750

UNITED STATES PATENT OFFICE

GEORGE M. SHISLER, OF BAINBRIDGE, NEW YORK, ASSIGNOR, BY MESNE ASSIGNMENTS, TO THE CASEIN MANUFACTURING COMPANY OF AMERICA, INC., OF NEW YORK, N. Y., A CORPORATION OF DELAWARE

ADHESIVE MATERIAL CONTAINING CASEIN

No Drawing. Application filed April 27, 1928. Serial No. 273,438.

This invention has for its object the production, from casein, of a new and useful glue base having the particular property that when mixed with a comparatively small amount of water it forms a liquid glue of exceptional fluidity which permits of easy spreading with a brush or by the machinery commonly employed.

The term "casein" as used herein both in the specification and claims is intended to apply (as in the adhesive industry) to casein obtained from milk and does not apply to proteid materials of an alkali-soluble nature, found in leguminous oil-bearing seeds, which proteids are known to be different in chemical composition and in many of their properties, from milk casein.

So far as I am aware, in the preparation of casein adhesives for wood-working and other purposes, it has been necessary to use a relatively large amount of water in order to obtain a consistency suitable for spreading. Thus, while certain commercial formulas for casein glues published in the literature call for a minimum proportion of 2 parts of water to 1 part of the glue base, it will be found that when the amount of added chemicals such as alkalis, etc., is deducted from such formulas, the actual proportion of water to the casein used is at least 3 to 1. Even then, it is not uncommon for some purposes to apply the glues warm, in order to obtain a more fluid consistency. (I note that usually more than two parts of water are added to 1 part of the glue base.)

By my invention I am able to use as little as 1 part (or even 2/3 part) of water to 1 of casein, if an appropriate organic thinning agent is used, such as an alcohol or a ketone, and still have a free-flowing, very sticky glue or adhesive. Such glue I have found to be of particular advantage for the glueing of glass, of metal, rubber, leather, artificial leather, waxed paper, oilcloth and for many other purposes, especially where a glue is required which must dry quickly, be very sticky and tacky and contain a very limited amount of water.

My invention consists in the use of a dispersing substance of the amide class, such as carbamide, thiocarbamide, acetamide; or a substance or substances capable of producing a suitable amide by intramolecular re-arrangement, e. g. ammonium thiocyanate, which latter would be transformed into thiourea $CS(NH_2)_2$, and such substances are hereinafter included in the expression "amide-forming compound".

The proportions of the ingredients that I have found to give satisfactory results may range from:—

| | Parts |
|---|---|
| Casein | 100 |
| Water | 100 to 200 |
| Dispersing agent | 15 to 100 |
| Alkali | 0 to 13 |

When an alcohol or a ketone is used as the thinning agent, I may use as little as 50 parts of water to 100 of casein but in this case some alkali (preferably 3–8%) must be used.

The amount of water may be increased as far as desired, provided that the proportion of the dispersing agent is correspondingly increased.

In order to describe more fully this invention I give, below, by way of illustration, examples showing workable formulas with various dispersing agents.

Example I 100 parts of commercial air-dried casein, 90 parts urea, 100 parts water. The ingredients are mixed together and after a few hours disperse or dissolve without the aid of heat, but the mixture may be heated with stirring, say to between 140 and 160° F., for 10 or 15 minutes to hasten the dissolving. In this example no alkali is used. The character of the resulting product is such, that the addition of any considerably further amount of water or of an alcohol or ketone, produces instead of the expected thinning, an undesirable thickening or precipitation. Because of this very fact, however, the product when made according to Example I, is quite water-resistant. It is very sticky and can be used where substantially waterproof results are desired. This product, moreover, can be used for the gluing of any substance wherein an alkali, even though mild, might be injurious.

*Example II*

100 parts of commercial casein, 48 parts of urea, 4 parts of sodium carbonate, 160 parts of water. The method of mixing and dissolving is the same as in Example I. This glue is somewhat stronger than that in Example I but is less waterproof. It can, however, be diluted greatly with water or with alcohol, acetone, or the like. In place of sodium carbonate, any other alkali can be used such as borax, ammonia, trisodium phosphate, lime, etc., and the amount of alkali may be varied to a considerable extent. Repeated experiments have shown that as much as 10 parts of alkali to 100 parts of casein and 48 parts of urea can be used.

*Example III*

60 parts of commercial dry casein, 16 parts of thiourea, 100 parts of water, 2.4 parts of ammonia (26° Bé.). The method of mixing and dissolving is the same as in Example I.

*Example IV*

60 parts of commercial dry casein, 30 parts of ammonium thiocyanate, 80 parts of water, 3.6 parts of 26° Bé. ammonia, (or corresponding amounts of other alkalis). The method of mixing and dissolving is the same as in Example 1. The dissolved product may be thinned with water or, after cooling, with alcohol, acetone or similar liquid, if desired. The alkali may be omitted, in which case, however, the resulting product will be unsuitable for thinning to any considerable extent with water, alcohol or a ketone. Ammonia thiocyanate mentioned in this example is an example of an ammonium compound which is capable of producing an amide (thiourea in this case) by intra-molecular re-arrangement.

*Example V*

60 parts of commercial casein, 40 parts acetamide, 100 parts water, 10 parts 26° Bé. ammonia. The method of mixing and dissolving is the same as in Example I. This product may be diluted to a considerable extent with water and to a large extent with alcohol, acetone and the like. In this formula a small amount of alkali is essential. If neutral acetamide is used, 2 parts of 26° Bé. ammonia are sufficient.

I wish it to be understood that the above examples are given simply by way of illustration, and that the proportions of the ingredients can be varied considerably. I may also add to these sticky glues various other substances such as coloring matter, pigments, fibrous substances or other desired materials.

The examples given above relate to the making of a liquid glue ready for use but I do not limit this invention to liquid glues as such, since in many cases it may be desirable to furnish the "glue base" (which is a term recognized in this art) in a dry form ready to be dissolved or mixed with water, etc., at the place where the glue is to be used. In such cases I may mix the dry dispersing agents such as, for example, the urea (or other amide compound) as mentioned in Example I, with the dry casein in the desired proportions with or without other solids. These dry substances are mixed together in any suitable apparatus and the material is then ready to pack and ship to the point where it is to be used. At the point of use this mixture is simply added to the desired amount of water (with or without the subsequent addition of alkalies, ammonia, alcohol, ketone, etc., or of pigments, fillers, etc.) and stirred until the glue is dissolved this operation being hastened if desired by the application of heat.

Similarly, a glue-base consisting of casein, urea and sodium carbonate as set forth in Example II, can be mixed dry as described above and when required for use, simply mixed with water, and stirred with or without heating, until a homogeneous, fluid product is obtained, to which may then be added suitable diluents or other substances as aforesaid, if desired.

If an alkaline solution such as ammonia is to be used instead of a dry alkali, such liquid will be added at the point where the glue is made up, but the method of dissolving the glue is to be carried out in the same general manner as described in this specification. Thus in Example III, if the glue base is to be shipped dry, the specified amounts of commercial casein and thiourea are mixed together dry and shipped to the point where it is to be used. The mixture is then incorporated with about 100 parts of water and thereafter thoroughly stirred, with the addition of 2.4 parts of 26° Bé. ammonia and, if desired, with application of heat until a uniform, smooth-flowing product is obtained.

These examples illustrate in a general way the manner in which the materials may be made and shipped in the dry form.

In the appended claims, I use the term "adhesive material" to cover either the glue base or the ultimate liquid adhesive. I am aware that thiourea has been used with hide glue in the preparation of adhesives but so far as I am aware it has not hithertofore been used in conjunction with casein for the purposes above set forth.

In said claims, the term "amide" is intended to cover the use of the free amide itself, or substances which produce the amide, as above referred to.

I claim :—

1. An adhesive material comprising casein, an amide, an alkali and water, together with a liquid organic diluting agent substantially as described.

2. A dry glue base containing casein and not substantially more than an equal weight of an amide thinning agent.

3. A dry glue base comprising casein, an amide thinning agent, and lime, such base giving a thin-flowing glue when mixed with water in the proportion of one part of casein with not over one and two-third parts of water, such thin-flowing adhesive being readily miscible with alcohol and acetone.

4. A glue comprising 100 parts of casein and about 15 to 100 parts of an amide dispersing agent.

5. A glue comprising casein, an amide dispersing agent and an alkali.

6. A glue comprising casein, an amide dispersing agent and a solid alkali.

7. A glue comprising 100 parts of casein, about 15 to 100 parts of an amide dispersing agent and an alkali.

8. A dry glue base comprising casein and an ammonium salt which is an amide-forming compound.

9. A glue comprising 100 parts of casein and about 15 to 100 parts of an amide dispersing agent, and a sufficient amount of water to dissolve substantially all of said casein.

10. A glue comprising casein, an amide dispersing agent, an alkali and a sufficient amount of water to dissolve substantially all of said casein.

11. A glue comprising 100 parts of casein, about 15 to 100 parts of an amide dispersing agent, an alkali, and a sufficient amount of water to dissolve substantially all of said casein.

12. A glue comprising 100 parts of casein and about 15 to 100 parts of an amide dispersing agent, and an aqueous liquid containing an organic solvent, which liquid is in amount sufficient to dissolve substantially all of said casein.

13. A glue comprising casein, an amide dispersing agent, an alkali and an aqueous liquid containing an organic solvent, which liquid is in amount sufficient to dissolve substantially all of said casein.

14. A glue comprising 100 parts of casein, about 15 to 100 parts of an amide dispersing agent, an alkali and an aqueous liquid containing an organic solvent, which liquid is in amount sufficient to dissolve substantially all of said casein.

15. An adhesive material comprising casein, an alkali and an amide, together with a liquid vehicle, the same constituting a liquid adhesive of workable viscosity even when only a small amount of water is present in such liquid adhesive.

16. A glue base comprising casein and ammonium thiocyanate.

17. A glue base comprising casein and ammonium thiocyanate, the former being in amount substantially greater than the latter.

18. An adhesive material of workable viscosity which comprises casein and an amide, together with water, the casein to water ratio being at least 1:2.

19. A glue base comprising one part of casein and less than one part of an ammonium salt which is an amide-forming compound.

20. A glue base comprising two parts of casein and about one part of an ammonium salt which is an amide-forming compound.

21. A glue base comprising two parts of casein and about one part of ammonium thiocyanate, which mixture, on mixing with water will practically all dissolve.

22. A mixed glue base comprising 60 parts of casein and less than 60 parts of ammonium thio-cyanate, which mixture, when added to 80 parts of water and 3.6 parts of 26° Bé. ammonia water, will dissolve to form a liquid glue.

In testimony whereof I affix my signature.

GEORGE M. SHISLER.